United States Patent
Thakore et al.

(10) Patent No.: US 11,907,147 B1
(45) Date of Patent: Feb. 20, 2024

(54) PROGRAMMABLE MESSAGE INSPECTION ENGINE IMPLEMENTED IN HARDWARE THAT GENERATES AN OUTPUT MESSAGE USING A CONTENT MODIFICATION PLAN AND A DESTINATION CONTROL PLAN

(71) Applicant: Beijing Tenafe Electronic Technology Co., Ltd., Beijing (CN)

(72) Inventors: Priyanka Nilay Thakore, Mountain View, CA (US); Lyle E. Adams, San Jose, CA (US)

(73) Assignee: Beijing Tenafe Electronic Technology Co., Ltd. (CN)

( * ) Notice: Subject to any disclaimer, the term of this patent is extended or adjusted under 35 U.S.C. 154(b) by 0 days.

(21) Appl. No.: 18/216,987

(22) Filed: Jun. 30, 2023

Related U.S. Application Data

(60) Provisional application No. 63/392,992, filed on Jul. 28, 2022.

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
CPC .... G06F 13/36; G06F 13/362; G06F 13/3625; G06F 13/364; G06F 13/368; G06F 13/38; G06F 13/385; G06F 13/387; G06F 2213/40; G06F 2213/4001; G06F 2213/4004
See application file for complete search history.

(56) References Cited

U.S. PATENT DOCUMENTS

| | | | |
|---|---|---|---|
| 6,735,211 B1 | 5/2004 | Karasawa | |
| 8,332,473 B1 * | 12/2012 | Fouts | H04L 67/565 709/206 |
| 8,407,707 B2 * | 3/2013 | Sonnier | H04L 49/506 718/100 |
| 8,949,474 B1 * | 2/2015 | Swarbrick | G06F 12/10 711/2 |
| 9,760,281 B2 | 9/2017 | Ramalingam | |
| 11,645,011 B2 | 5/2023 | Lee | |
| 11,646,980 B2 | 5/2023 | Chilikin | |
| 11,646,987 B1 * | 5/2023 | Pathak | H04L 51/212 709/206 |
| 2004/0187089 A1 | 9/2004 | Schulz | |
| 2009/0122703 A1 | 5/2009 | Gangwal | |

(Continued)

OTHER PUBLICATIONS

U.S. Appl. No. 18/195,518, filed May 10, 2023.

*Primary Examiner* — Raymond N Phan
(74) *Attorney, Agent, or Firm* — Van Pelt, Yi & James LLP

(57) ABSTRACT

A message inspection engine, implemented in hardware in a System on Chip (SOC), is configured using configuration information to obtain a configured message inspection engine. An input message is received at the configured message inspection engine from an upstream functional module in the SOC. The configured message inspection engine is used to analyze the input message to determine a content modification plan and a destination control plan and to generate an output message based at least in part on the input message, the content modification plan, and the destination control plan, including by populating the output message with a downstream functional module specified by the destination control plan. The output message is output from the configured message inspection engine.

20 Claims, 8 Drawing Sheets

(56) References Cited

U.S. PATENT DOCUMENTS

| | | |
|---|---|---|
| 2015/0169406 A1 | 6/2015 | Li |
| 2017/0093770 A1* | 3/2017 | Flajslik ................ H04L 51/212 |
| 2018/0210845 A1 | 7/2018 | Jafri |
| 2019/0097800 A1* | 3/2019 | Melrose .............. H04L 63/0435 |
| 2019/0258920 A1 | 8/2019 | Lie |
| 2022/0334770 A1 | 10/2022 | Guo |

* cited by examiner

PROGRAMMABLE MESSAGE INSPECTION ENGINE IMPLEMENTED IN HARDWARE THAT GENERATES AN OUTPUT MESSAGE USING A CONTENT MODIFICATION PLAN AND A DESTINATION CONTROL PLAN

CROSS REFERENCE TO OTHER APPLICATIONS

This application claims priority to U.S. Provisional Patent Application No. 63/392,992 entitled PROGRAMMABLE MESSAGE INSPECTION ENGINE filed Jul. 28, 2022 which is incorporated herein by reference for all purposes.

BACKGROUND OF THE INVENTION

System On Chip (SOC) devices include a combination of hardware functional modules and a firmware complex in which firmware runs on one or more processor modules. Although some SOC devices are designed for interoperability with a limited and/or fixed number of other (e.g., electronic and/or SOC) devices, some SOC devices, such as storage controllers, are expected to interface with a wide variety of devices (e.g., from different manufacturers, having different interfaces, having different (e.g., timing) performance, etc.). For the latter type of SOC, new features and/or components which lend themselves to adaptability and/or to performance improvements would be desirable.

BRIEF DESCRIPTION OF THE DRAWINGS

Various embodiments of the invention are disclosed in the following detailed description and the accompanying drawings.

DETAILED DESCRIPTION

Figure 1:
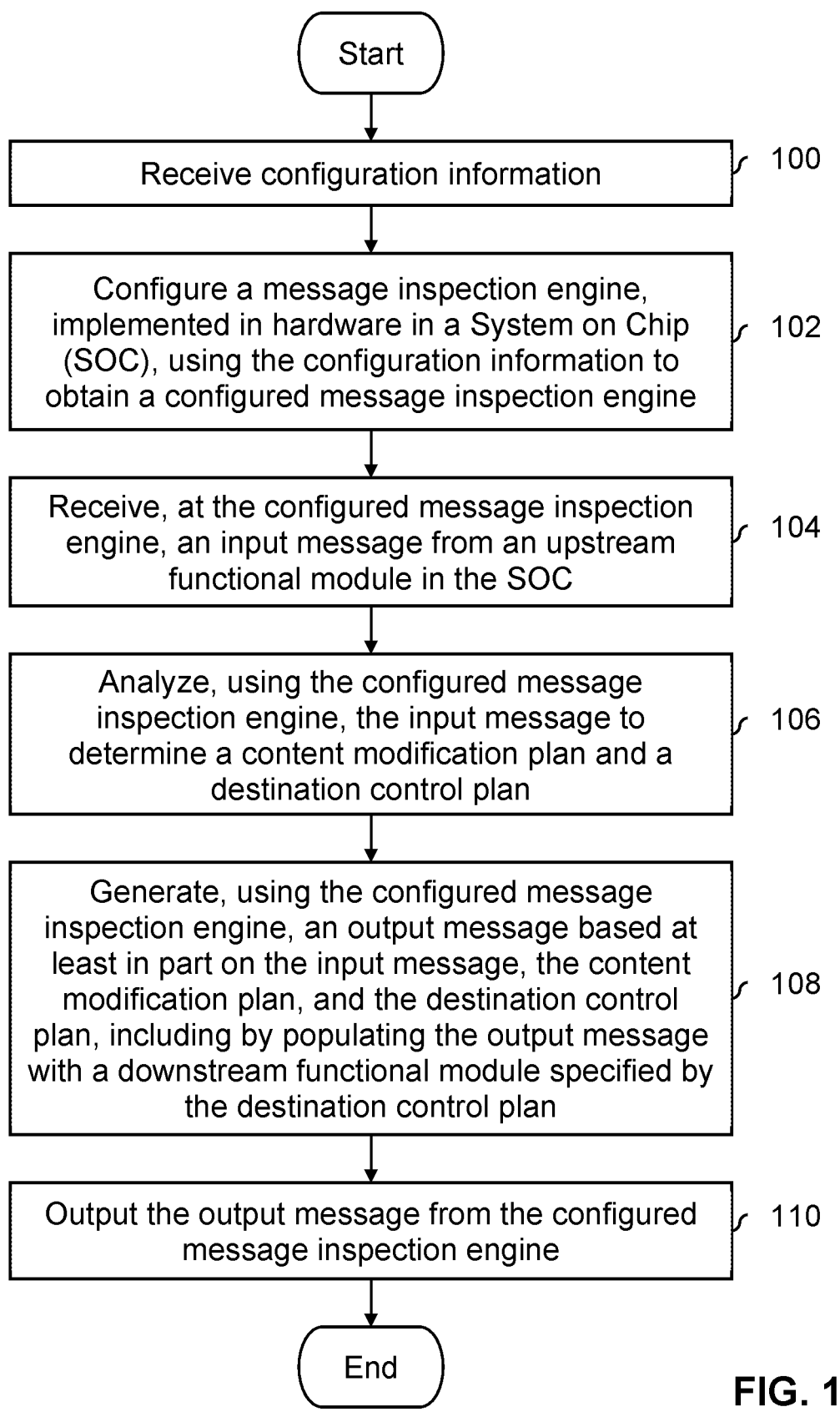
FIG. 1 is a flowchart illustrating an embodiment of a process to configure and use a message inspection engine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to configure one or more message inspection engines in a System On Chip for a variety of purposes are described herein. In some embodiments, a (e.g., multi-purpose and/or multi-functional) message inspection engine (e.g., implemented in hardware in the SOC) is configured to perform error handling, for example, by identifying relevant and/or target error messages from an upstream functional module and generating an output message for a downstream functional module (e.g., to begin some error recovery or error response) without requiring the intervention of a firmware complex. In some embodiments, a message inspection engine is configured to perform message acceleration, for example, by identifying relevant and/or target input messages and generating output messages (e.g., which requires some message content masking, message content transformation, message sequence (re-)sorting, etc.) without requiring the intervention of a firmware complex. The following figure describes one example process for configuring and using such a message inspection engine.

FIG. 1 is a flowchart illustrating an embodiment of a process to configure and use a message inspection engine. In some embodiments, there is a plurality of (e.g., multi-purpose and/or multi-functional) message inspection engines that are included in a (e.g., centralized) message routing module that some or all functional modules send all of their messages to.

At 100, configuration information is received. In some embodiments, a message routing module includes one or more message inspection engines and programmable configuration registers; the configuration information may be received or otherwise obtained from the programmable configuration registers. In various embodiments, the programmable configuration registers may have default values, may be set (if the default value is not desired) during initialization, and so on.

At 102, a message inspection engine, implemented in hardware in a System on Chip (SOC), is configured using the configuration information to obtain a configured message inspection engine. For example, as will be described in more detail below, some message inspection engines may be configured to perform error handling while other message inspection engines may be configured to perform message acceleration (i.e., offloading message transformation and/or processing from a firmware complex). The implementation of the message inspection engine in hardware enables faster processing than the firmware complex and also offloads the functionality and/or processing performed by the message inspection engine(s) from the firmware complex.

At 104, at the configured message inspection engine, an input message from an upstream functional module in the SOC is received. In some embodiments, some or all of the messages that are output by the upstream functional module are received and processed in the manner described in FIG. 1.

At 106, the input message is analyzed using the configured message inspection engine to determine a content modification plan and a destination control plan. For example, an upstream functional module may generate many different types of messages and it may not be certain when the target messages and/or messages of interest will occur and so all messages are inspected. It is noted that message intervention (e.g., in the form of content modification, redirection of the output message to a new downstream functional module, etc.) is not necessarily performed on all input messages and so in some cases the content modification plan is "no content modification" and/or the destination control plan is "no destination modification."

At 108, using the configured message inspection engine, an output message is generated based at least in part on the input message, the content modification plan, and the destination control plan, including by populating the output message with a downstream functional module specified by the destination control plan. As described above, in some cases, there is no intervention and/or modification.

At 110, the output message is output from the configured message inspection engine. For example, the output message may be sent out on some message bus in the SOC. In some embodiments, the output message is temporarily stored in some outbound message queue before being sent to the downstream functional module specified in the output message.

It may be helpful to illustrate a block diagram of an SOC that performs the process of FIG. 1. The following figure shows one such exemplary SOC.

Figure 2:
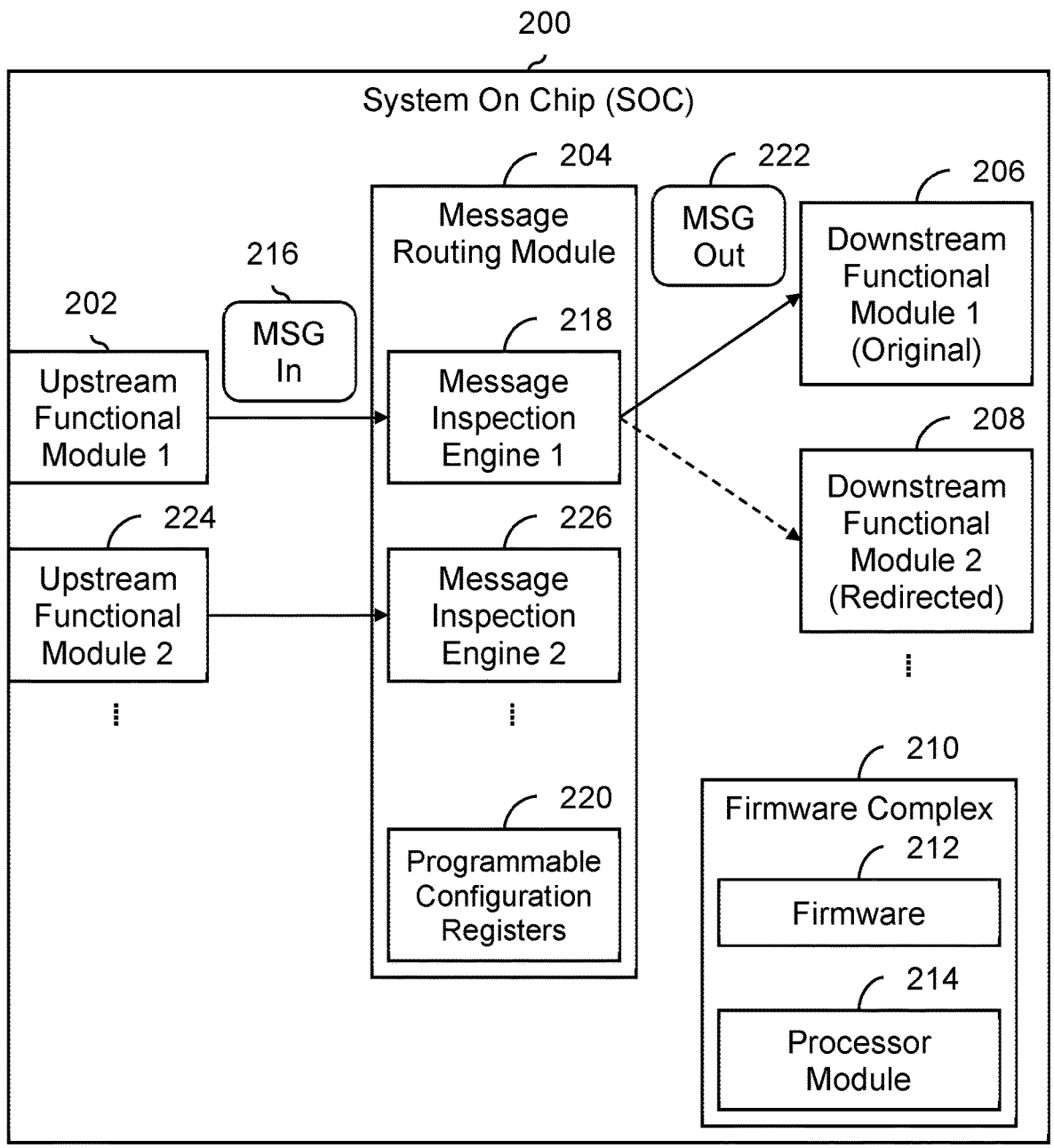
FIG. 2 is a diagram illustrating an embodiment of a System On Chip (SOC) that includes a message routing module with one or more message inspection engines.

FIG. 2 is a diagram illustrating an embodiment of a System On Chip (SOC) that includes a message routing module with one or more message inspection engines. The exemplary message routing module (204) in the SOC (200) is one example of a device that performs the flowchart of FIG. 1.

In this example, an SOC (200) includes (e.g., hardware) functional modules, including a first upstream functional module (202), a message routing module (204), a first downstream functional module (206), and a second downstream functional module (208). The SOC (200) also includes a firmware complex (210) which in turn includes firmware (212) which runs on an associated processor module (214).

The first upstream functional module (202) generates or otherwise outputs a message, shown in the figure as MSG In (216) and sometimes referred to herein as the input message. In various embodiments, the message is a command message, a status message, an error message, etc.

The input message (216) is inspected, processed, transformed, and/or rerouted by the first message inspection engine (218) in the message routing module (204) according to the configurations and/or settings in the programmable configuration registers (220) as well as to the degree with which the input message (216) meets specific (e.g., trans-formational, rerouting, etc.) criteria laid out in the programmable configuration registers (220). For example, if the input message (216) meets some criteria specified in the programmable configuration registers (220) associated with rerouting, then the output message (i.e., MSG Out (222)) is redirected to a second downstream functional module (208) instead of to a first downstream functional module (206) that the input message (216) was originally intended to be sent to.

In this example, there are additional upstream functional modules that generate and send messages to the message routing module (204). For example, the second upstream functional module (224) sends its messages to the second message inspection engine (226) which analyzes the incoming message and intervenes as specified by the programmable configuration registers (220). In some embodiments, some or all hardware functional modules (e.g., including 202 and 224) send some or all of their messages to the message routing module (204), which acts as a (e.g., centralized) message routing module that most or all messages pass through. This enables the message routing module (204) (at least in this example) to inspect most or all messages and modify and/or reroute them as specified by the programmable configuration registers.

Alternatively, in some other embodiments, it may be determined that (e.g., for design-tradeoff and/or application-specific reasons) at least one upstream functional module does not send its message to a (e.g., central) message routing module (e.g., 204). For example, an established and/or stable functional module where the likelihood of needing to intervene is low may not necessarily send its messages to a (e.g., central) message routing module (e.g., 204). This may, for example, reduce the amount of routing in the SOC.

In some embodiments, the message inspection engine (218) is configured (e.g., using the programmable configuration registers (220)) to look for error messages (e.g., including ones that were previously undefined and/or unanticipated types of error) that can be handled and/or redirected without requiring the intervention of the firmware complex (210). For example, transient errors of any cause can be classified as requiring an automatic retry. The message inspection can redirect the Message In back to the message originator for retry without regard to the specific error conditions. Otherwise, the message would be sent to firmware to determine the error classification. Sending the message to firmware for classification when no additional actions are needed, except to initiate a retry, consumes firmware resources that would otherwise be available for functional operation. To put it another way, if an SOC encounters an error message, some other SOC systems without a message routing module (e.g., 204) may send such error messages to the firmware complex (210) for handling since the firmware complex (210) typically has the most process context and/or processing capability in an SOC. The firmware (212), for example, may be (re)written to add error handling capabilities so that the error can be handled without having to re-manufacture (i.e., "re-spin") the SOC. However, having the firmware complex (210) handle error messages is undesirable because there is typically a fixed amount of memory for firmware (212) and firmware memory space may be limited. Also, performing error handling operations may take firmware complex (210) resources away from more important and/or timing-critical operations.

In contrast, the programmable configuration registers (220) can be used to make the message inspection engine (218) identify and handle error messages, including by (as an example) transforming or otherwise reformatting the input message (216) into an appropriate output message (222) (e.g., to initiate appropriate error handling and/or error recovery at a downstream functional module (e.g., 206 or 208)), and redirect the output message (222) if so configured (e.g., to the second downstream functional module (208)), all per the programmable configuration registers (220). Having the message routing module (204) handling errors is desirable in many applications because it conserves firmware complex (210) resources so as not to interfere with more important and/or timing-critical operations and does not consume firmware memory space which may be scarce. Also, some types of SOC (e.g., a storage controller SOC) may interface with a variety of devices (e.g., different types of storage media from different manufacturers) which may have differences in timing and/or operations. Interacting with a new device may cause new types of errors to be encountered but the programmable nature of the message inspection engine(s) permits (at least some) new errors to be handled without firmware (complex) intervention. Furthermore, configuring a message inspection engine can, for example, allow the system performance (e.g., of the firmware, of a solid state drive (SSD) system, etc.) to be consistent across different media devices because the specific error messaging unique to each device can be unified into a common message encoding for the downstream module.

In some embodiments, the message inspection engine (218) is configured (e.g., using the programmable configuration registers (220)) to accelerate message processing and/or handling which would otherwise be handled by the firmware complex (210). For example, when going from one domain to another in the SOC, or from an upstream functional module (e.g., 202) to a downstream functional module (e.g., 206), some fields and/or content in the input message (216) may need to be stripped out or filtered out and new fields and/or content may need to be retrieved and inserted into the output message (222), if there is a domain change or context change. This application of the message routing module (204) is sometimes referred to herein as message acceleration. As with error handling, the benefits to using the message routing module (204) to perform message acceleration is that it does not consume firmware memory space (which may be scarce), does not impact other (e.g., more important and/or timing-critical) operations performed by the firmware complex (210), and may be faster than if the firmware complex (210) performed it (e.g., because the message routing module (204) is implemented in hardware which is often faster). In addition, hardware resources can be conserved with message acceleration. In an example usage, a common resource tracking module can receive resource usage updates (e.g., allocate a resource, free a resource, etc.) from a variety of sources. A message accelerator can extract the resource usage information from the incoming message and forward the relevant information to the resource tracking module using a data format that is amenable to the resource tracking module. Such application of message acceleration allows for greater component reuse within the chip, saving hardware resources (e.g., bandwidth, routing, and/or area) and ultimately lowering product cost. More detailed message acceleration examples are described below.

In this example, the message routing module (204) is implemented in hardware so the error handling and/or message acceleration is performed more quickly than if it were performed by the firmware complex (210).

In some embodiments, there are multiple message inspection engines (e.g., 218 and 226), each of which operates independently of one another and can be configured using the programmable configuration registers (220). For example, in an error-prone and/or noisy environment, a first message inspection engine may be configured to handle a first unanticipated type of error and a second message inspection engine may be configured to handle a second unanticipated type of error. In a less error-prone and/or less noisy environment, the two message inspection engines may be configured to perform two types of message acceleration.

To save hardware resources (e.g., signal routing between modules), in some embodiments, the various messages from the upstream modules (e.g., 202 and 224) are transported to the message inspection engines (e.g., 218 and 226) via a common signal interface with the message routing module (e.g., 204). In some such embodiments, an inbound message (e.g., 216) to a message routing module (e.g., 204) is sent to all message inspection engines (e.g., 218 and 226) contained within the message routing module.

As shown in this example, in some embodiments, an SOC includes a second upstream functional module (e.g., 224) and a second message inspection engine (e.g., 226) that is configured using the configuration information (e.g., 220) to obtain a second configured message inspection engine (e.g., 226); the (first) configured message inspection engine (e.g., 218) is configured to analyze those input messages from the (first) upstream functional module (e.g., 202) and ignore those input messages from the second upstream functional module (e.g., 224); and the second configured message inspection engine (e.g., 226) is configured to ignore said those input messages from the (first) upstream functional module (e.g., 202) and analyze said those input messages from the second upstream functional module (e.g., 224).

As shown in this example, in some embodiments, an SOC includes a second upstream functional module (e.g., 224) and a second message inspection engine (e.g., 226) that is configured using the configuration information (e.g., 220) to obtain a second configured message inspection engine (e.g., 226); the configured message inspection engine (e.g., 218) performs error handling, including by examining input messages from the upstream functional module (e.g., 202) for one or more specified types of error messages; and the second configured message inspection engine (e.g., 226) performs message acceleration, including by examining input messages from the second upstream functional module (e.g., 224) for one or more specified types of non-error messages.

The following figure shows an example block diagram of a message inspection engine.

Figure 3:
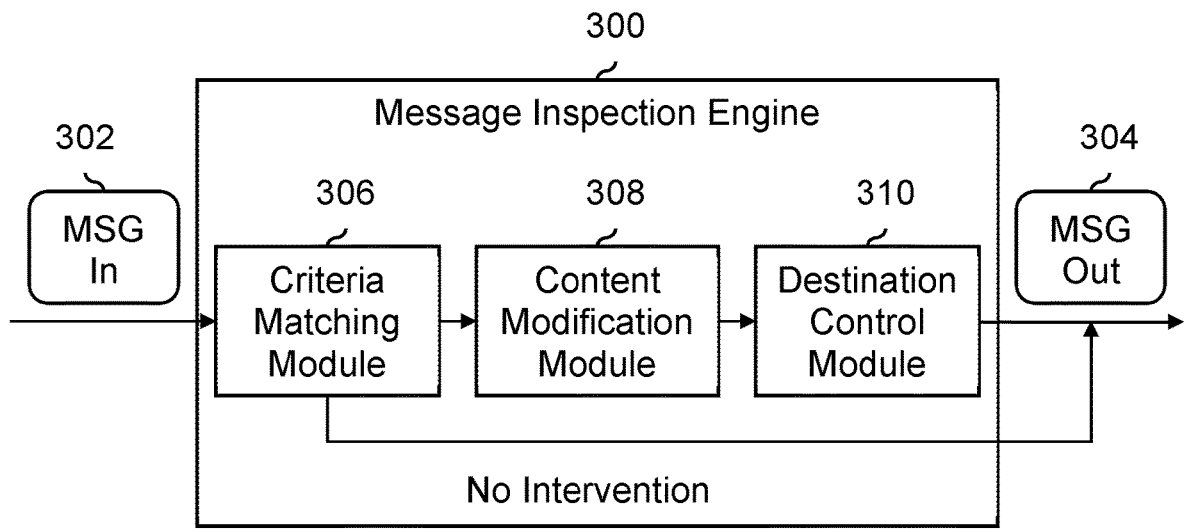
FIG. 3 is a diagram illustrating an embodiment of a message inspection engine.

FIG. 3 is a diagram illustrating an embodiment of a message inspection engine. In some embodiments, message inspection engine (218) in FIG. 2 is implemented as shown. In this example, the message inspection engine (300) inputs an input message (302) and outputs an output message (304). In this example, the criteria matching module (306) (e.g., once configured) inspects specified portions of the input message (302) and decides (e.g., based on the inspected portions of the input message (302) and specified criteria for those inspected portions in the programmable configuration registers (e.g., 220 in FIG. 2)) whether to intervene or not.

If the criteria matching module (306) determines that no intervention is required for the input message (302), then the input message (302) is output without intervention as the output message (304) (e.g., without modification and without redirection).

If, the input message (302) meets the relevant criteria, the criteria matching module (306) passes the input message to the content modification module (308) where the content of the message is modified (e.g., if so specified and in the manner per programmable configuration registers (e.g., 220 in FIG. 2)). More detailed content modification examples are described below.

In some embodiments, content modification module (308) changes the size of the message such that the size of the output message (304) does not necessarily match that of the input message (302). For example, an input message (302) may contain unnecessary and/or irrelevant message content (e.g., from the perspective of a downstream functional module) and in some embodiments the content modification module (308) extracts the important and/or relevant portions of the input message (302) and includes that extracted information in the output message (304), such that the size may be different after content modification. Alternatively, in some embodiments, the size of the output message (304) matches the size of the input message (302) and unnecessary and/or irrelevant message content is merely masked out (e.g., set to all zeros) or overwritten with more relevant information. For example, the content modification module (308) may be implemented in a variety of ways (e.g., merely masking and/or overwriting vs. being able to excise and/or insert).

The (e.g., modified) message is passed from the content modification module (308) to a destination control module (310) which determines an appropriate destination for the message. Returning briefly to FIG. 2, this may include sending the output message to an original downstream functional module (e.g., 206), or rerouting or otherwise redirecting the output message to a new downstream functional module (e.g., 208) per the programmable configuration registers (220).

In some embodiments, a standardized message format is used throughout an SOC. The following figure shows one example of a standardized message format.

Figure 4:
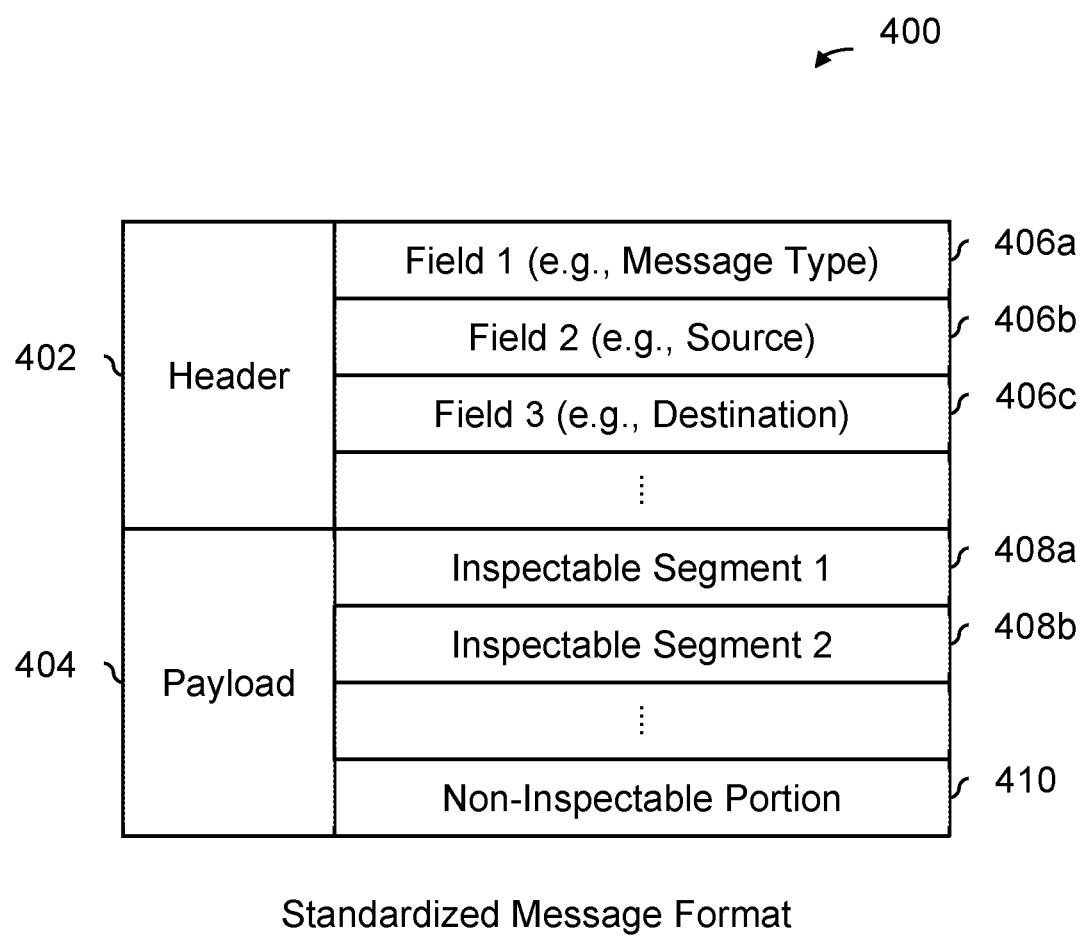
FIG. 4 is a diagram illustrating an embodiment of a standardized message format that is used throughout an SOC.

FIG. 4 is a diagram illustrating an embodiment of a standardized message format that is used throughout an SOC. In this example, the message format (400) includes a header (402) and a payload (404). The header (402) includes multiple fields (e.g., 406a-406c) which in this example have fixed, predefined sizes. In this example, the first field (406a) is used to specify the type of message being exchanged; depending upon the type of message specified in this first field (406a), the meanings and/or usages of the subsequent fields may vary. Some examples of the message types that can be specified in the first field (406a) include various command messages (e.g., which cause a downstream functional module to perform the associated command) or status messages (e.g., including error messages, having various sub-types).

The second field (406b) and third field (406c) in the exemplary message header (402) are used to specify the message source and destination, respectively. In some embodiments, the destination specified in the third field (406c) is not a message routing module but rather a downstream functional module to which the message is ultimately intended to be sent. For example, in FIG. 2, the second field (406b) may be the upstream functional module (202) that generates the input message (216) and the third field (406c) may be the first (i.e., original) downstream functional module (206). It is noted that the third field (406c) may be changed to the second downstream functional module (208) in the output message (222) if the message is redirected.

In FIG. 2, the message inspection engine (218) is configured (e.g., per the settings in the programmable configuration registers (220)) to examine specified field(s) (of 406a-406c) in the header (402). For example, as described above, there may be multiple message inspection engines (218), each of which is operating independently. A first message inspection engine that is performing message acceleration may be configured to look for a specific source (e.g., in Field 2 (406b) in FIG. 4) that generates the messages being accelerated. In parallel, a second message inspection engine that is performing error handling may be configured to look for the source or upstream functional module (e.g., in Field 2 (406b) in FIG. 4) which sends out the error messages of interest. Naturally, there may be additional criteria that must be satisfied in order for a message inspection engine to intervene.

Returning to FIG. 4, the size of the header (402) is typically a manageable size and therefore in this example, all of the fields (406a-406c) in the header (402) are inspectable (e.g., by criteria matching module (306) in FIG. 2). This means that any information contained therein may be examined, accessed, and/or read and (subsequently and if desired) manipulated and/or processed (e.g., by content modification module (308) and/or destination control module (310) in FIG. 3).

In contrast, the size of the payload (404) may be quite large and so to keep the message routing module (e.g., 204 in FIG. 2) to a reasonable size, only a portion (in this example, the beginning portion) (e.g., 408a-408b) of the payload section (404) is inspectable (at least in this example). In other words, there is some non-inspectable portion (410) at the end of the payload (404). Having a smaller module that is not able to inspect or otherwise access all of a payload may be an acceptable tradeoff since in many or most cases, upstream functional modules are designed to put the most important and/or relevant information using a fixed and/or predefined field format.

In this example, the inspectable section (408a-408b) is divided up into predefined segments of a fixed size (e.g., a DWORD), including a first inspectable segment (408a), a second inspectable segment (408b), and so on. For example, different types of messages may use the payload in different ways and so depending upon the message type and information of interest within the payload, different segments (e.g., 408a-408b) may be of interest. For example, if the payload contains state or status information, it may be sufficient to examine or otherwise inspect the first segment (408a) without having to examine the second segment (408b). However, if the information of interest is longer (e.g., a link or address to a memory location that a message inspection engine (e.g., 218 in FIG. 2) will access to obtain the data stored therein), then both the first and the second segments (408a and 408b) may need to be accessed. Which segments to examine or otherwise inspect may be controlled or otherwise configured per the programmable configuration registers (e.g., 220 in FIG. 2).

As shown in this example, in some embodiments, an input message includes a header (e.g., 402) which in turn includes a plurality of fields (e.g., 406a-406c); analyzing the input message includes inspecting those fields in the plurality of fields that are specified by the configuration information; the input message further includes a payload (e.g., 404) which in turn includes a plurality of inspectable segments (e.g., 408a-408b) and a non-inspectable portion (410) that does not overlap with the plurality of inspectable segments; and analyzing the input message further includes inspecting those inspectable segments in the plurality of inspectable segments that are specified by the configuration information.

The following figures describe more specific examples of message types that a message inspection engine searches and intervenes for. First, some error handling examples are described. Then, some message acceleration examples are described.

Figure 5A:
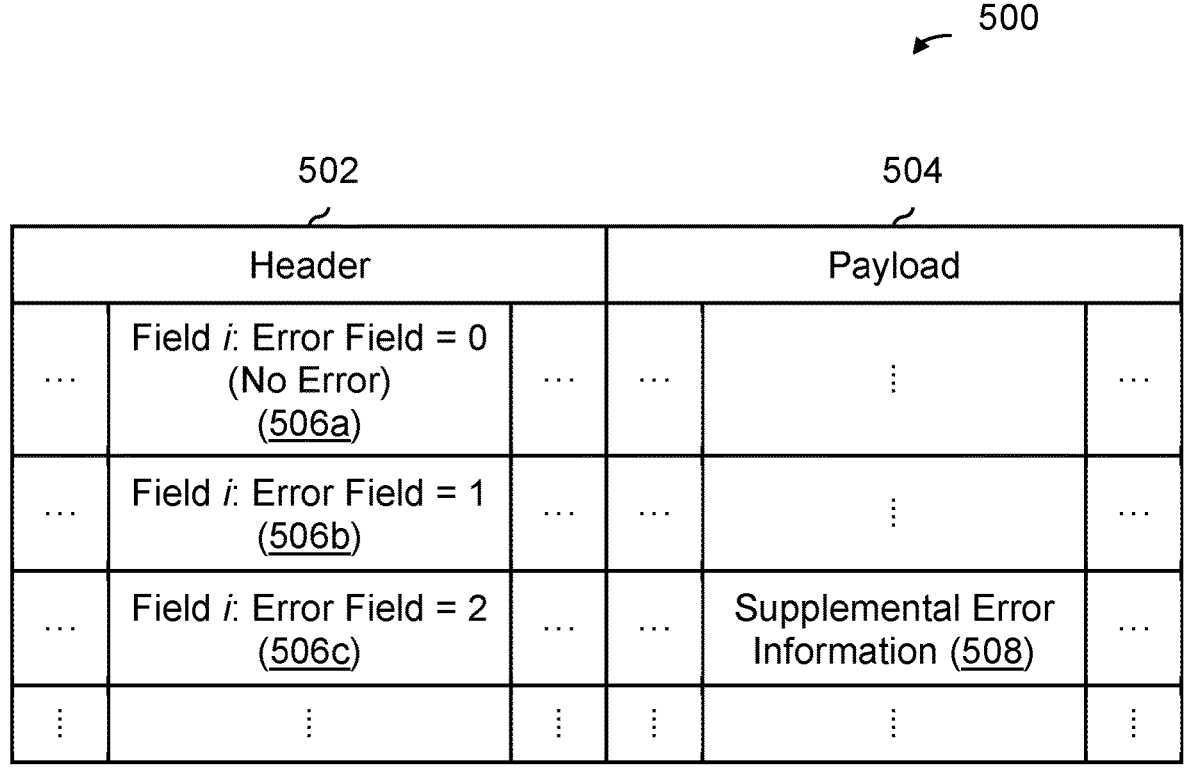
FIG. 5A is a diagram illustrating an embodiment of a message format with an error field.

FIG. 5A is a diagram illustrating an embodiment of a message format with an error field. In this example, the message format (500) includes a header (502) and a payload (504). One of the fields (i.e., Field i) in the header (502) is an error field (e.g., 506a-506c). In this example, the value contained in the error field indicates if there is an error and if so, what is the type of error.

In this example, if the value of the error field is zero (506a), this corresponds to "no error." If the value of the error field is one (506b), then an error was detected or occurred and this scenario is referred to (at least in these examples) as a first type of error. Similarly, if the value of the error field is two (506c), then an error was detected or occurred and it is referred to in these examples as a second type of error. For the second type of error (506c), the upstream and/or reporting functional module includes supplemental error information (508) in the payload (504). For example, the supplemental error information (508) may be at the beginning of the payload in some section that is able to be inspected or otherwise examined by a message inspection engine (see, e.g., 408a-408b in FIG. 4).

To summarize the usage of the error field (506a-506c), if the error field is a zero value (506a), then there is no error; if the error field is a non-zero value (e.g., 506b and 506c) then there is an error. Messages with a non-zero error field (e.g., 506b and 506c) may sometimes be referred to herein as error messages (e.g., because they indicate or signal an error).

The following figure shows exemplary functional modules in a storage controller that are related to the exemplary message (500) shown FIG. 5A.

Figure 5B:
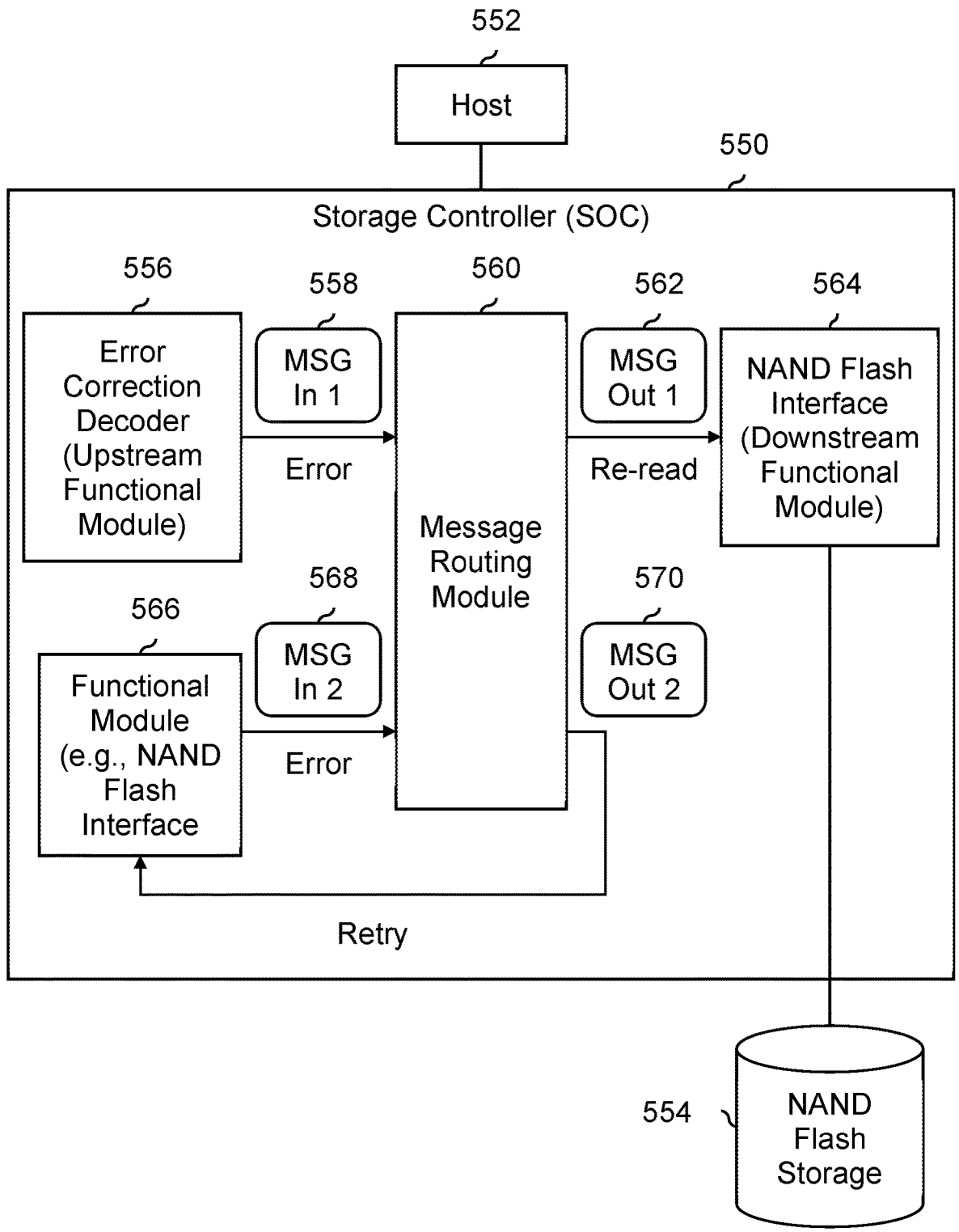
FIG. 5B is a block diagram illustrating an embodiment of a storage controller in which a message routing module performs error handling.

FIG. 5B is a block diagram illustrating an embodiment of a storage controller in which a message routing module performs error handling. In this example, a storage controller (550) is implemented as an SOC and sits between a host (552) and NAND Flash storage (554). The storage controller (550) reads and writes to the NAND Flash storage (554) as directed by the host (552).

In this example, the data stored on the NAND Flash storage (554) is error correction encoded prior to storage and so data that is read back from the NAND Flash storage (554) must be decoded by the error correction decoder (556) before it is passed to the host (552). Suppose that the error correction decoder (556) is unable to decode the read data and outputs a first input message (i.e., MSG In 1) (558) which has an error field set to one (see, e.g., 506b in FIG. 5A).

In this example, all messages from the error correction decoder (556) are passed to the message routing module (560) and so the message routing module (560) is able to inspect all messages and detect if MSG In 1 (558) has a certain error code or type of error being reported (e.g., an error field with a value of one (506b) in FIG. 5A). In this example, when error correction decoding fails, the error correction decoder (556) outputs an error message (e.g., where the error field is a non-zero value).

In some embodiments, a message routing module (560) is configured to look for error messages with a certain type of error code (e.g., an error field with a value of two (506c) in FIG. 5A) in combination with a certain value for supplemental error information (e.g., 508 in FIG. 5A).

In this example, the message routing module has been programmed or otherwise configured to (when those types of error messages are detected from the error correction decoder (556)) generate a first output message (i.e., MSG Out 1) (562) that is sent to the NAND Flash interface (564) and which causes that downstream functional module to perform a re-read of the NAND Flash storage (554). The re-read causes new read data to be returned, and the new read data can then be processed by the error correction decoder (556).

In some embodiments, all reads performed by the NAND Flash interface (564) on the NAND Flash storage (554) are soft reads where the read values are accompanied by likelihood or confidence values that indicate a certainty that the reported read value is correct or matched what was stored (e.g., as opposed to a hard read where no likelihood or confidence values are reported). In such embodiments, a soft re-read has a high likelihood of returning different read data and therefore the reattempted decoding by the error correction decoder (556) will not be a wasted attempt.

In some embodiments, a re-read initiated by MSG OUT 1 (562) changes a read configuration or setting associated with the re-read. For example, if the prior read was a hard read, then performing another hard read may be undesirable because it may have a high probability of returning essentially the same hard read data. In some embodiments, if the prior read is a hard read, then the re-read (associated with MSG OUT 1 (562)) is specified or otherwise configured to be a soft read which may require more time and/or consume more bandwidth but is preferable in this situation since decoding has already failed at least once. In some embodiments, some other read setting or parameter is modified for the re-read by MSG Out 1 (562).

The storage controller (550) also includes a functional module (566) that outputs MSG In 2 (568). In this example, the message routing module (560) is configured to examine input messages (e.g., 568) for a "needs retry" type of error message (e.g., having an error field that is set to a certain value and/or having certain supplemental error information associated with requiring a retry). If such messages are detected, the message routing module (560) is configured to generate MSG Out 2 (570) which performs a retry of the functional module (566). As such, MSG Out 2 (570) is sent back to functional module (566) and performs a retry of the functional module (566). For example, suppose that functional module 566 is actually NAND Flash interface (564) but acting in an upstream functional module capacity. Suppose that functional module (566)/NAND Flash interface (564) tried to access NAND Flash storage (554) but it was temporarily unavailable and/or busy. In such situations, functional module (566)/NAND Flash interface (564) may send MSG In 2 (568) with a "needs retry" type of error status which the message accelerator (i.e., message routing module (560)) resubmits as a retry command using MSG Out 2 (570).

It is noted that the two input messages (558 and 568) do not necessarily contain the destinations and/or downstream function modules to which the corresponding output messages (562 and 570) are ultimately sent. To put it another way, MSG In 1 (558) may not necessarily have its destination field (e.g., 406c in FIG. 4) populated with the NAND Flash interface (564); the message routing module (560) may assemble or otherwise generate MSG Out 1 (562) to have the NAND Flash interface (564) in a destination field. Similarly, MSG In 1 (558) may not necessarily have its destination field (e.g., 406c in FIG. 4) filled in with the functional module (566); the message routing module (560) assembles or otherwise generates MSG Out 2 (570) with that destination listed in the header.

In some cases, multiple types of error messages may be grouped together and handled in the same manner. Similarly, error messages from different upstream functional modules may be handled in a same or similar manner (e.g., the same output messages are generated but the destinations are populated with different information).

As shown in this example, in some embodiments, an SOC (further) includes a storage controller SOC; an upstream functional module includes an error correction decoder; a downstream functional module includes a storage media interface that communicates with storage media that is external to the storage controller SOC; and analyzing the input message includes: determining whether the input message satisfies an error message match criteria (e.g., does this match one or more types of error messages a given message inspection engine is configured to look for); and in the event it is determined that the input message satisfies the error message match criteria, the content modification plan includes generating an output message associated with re-reading the storage media and the destination control plan includes directing the output message associated with re-reading the storage media to the storage media interface.

In some such embodiments, the content modification plan further includes generating the output message associated with re-reading the storage media to change a read configuration associated with re-reading the storage media. For example this may include switching from an initial or earlier hard read to a soft re-read, changing a read threshold, or changing some other parameter, setting, or more associated with the re-read so that it is different than the initial or earlier read.

As shown in this example, in some embodiments, a content modification plan includes generating an output message associated with reconfiguration. For example, the output message may cause (e.g., at a downstream functional module and/or the destination of the output message) one or more register settings to be overwritten, causing some reconfiguration or change in mode or setting (e.g., the output message is a write message with the new configuration or settings value, and the location or address of the configuration register(s) being written). In some embodiments, a content modification plan includes generating an output message associated with a retry (e.g., causing a retry at a downstream functional module and/or the destination of the output message).

In some embodiments, a message routing module performs message acceleration. The following figures illustrate some message acceleration examples.

Figure 6A:
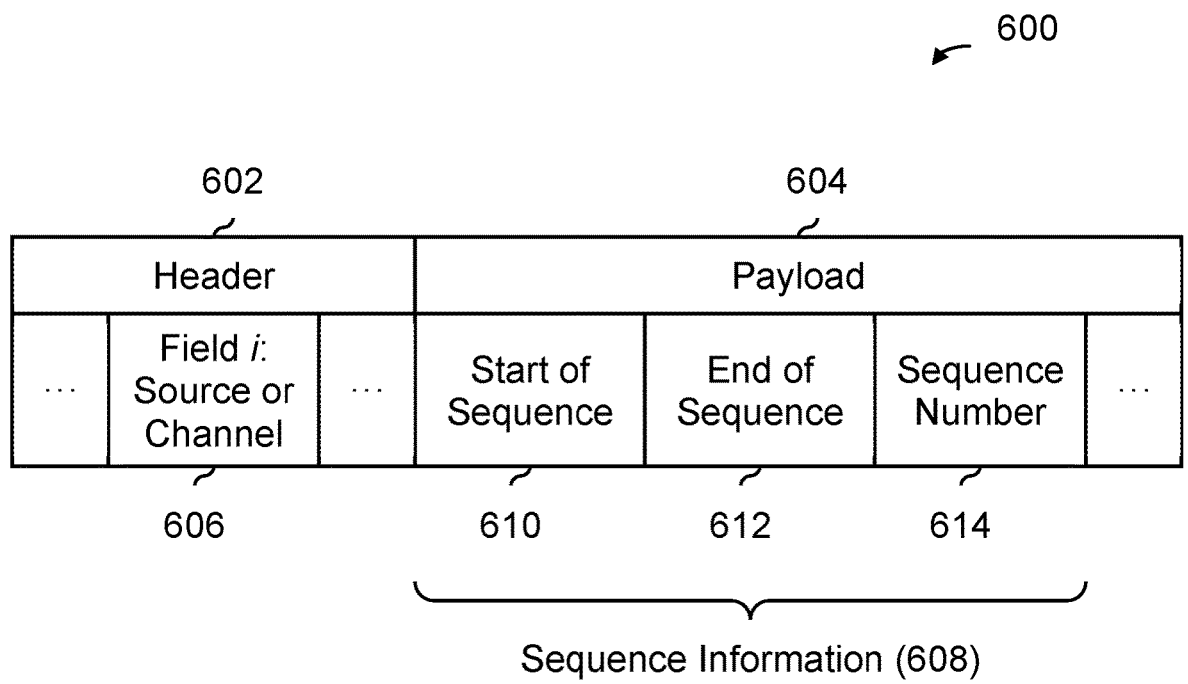
FIG. 6A is a diagram illustrating an embodiment of a message format with sequence information.

FIG. 6A is a diagram illustrating an embodiment of a message format with sequence information. In this example, the message format (600) includes a header (602) and a payload (604). One of the fields (606) includes a source or a channel from which a message is received. In this example, sequencing matters (e.g., to an upstream functional module and/or a downstream functional module) and therefore the payload (604) includes sequence information (608) which in turn includes a start of sequence (610), an end of sequence (e.g., indicator or flag) (612), and a sequence number (614). The sequence information is specific to each source or channel and so one source or channel may be using one sequence (or be at one point in a common range of sequence numbers) while another source or channel may be using a different sequence (or at a different point in the common range of sequence numbers). The start of sequence (610) and end of sequence (612) are flags or indicators (e.g., TRUE or FALSE) to indicate the respective start and end of a sequence (e.g., of related, sequential messages) for a given source or channel.

In some applications, messages will arrive (e.g., from a given upstream source or channel) with the sequence numbers (614) out-of-order and a downstream functional module will require the data or messages to be in (e.g., strictly incrementing) sequential order. In some cases, for maximum efficiency, it is desirable to have all of the messages be both in sequence and available before sending output messages to a downstream functional module. For example, the downstream functional module may be a shared resource, and for optimal usage, it is desirable to be able to "feed" the downstream functional module with all of the output messages with the sequence numbers in their proper order, and without any waiting or idle time between the messages. To summarize, to satisfy a functional and/or interface requirement and/or to optimize performance, it may be desirable to: (1) sort messages (or their corresponding content that is of interest) so the sequence numbers are in the proper (e.g., ascending) order, and/or (2) ensure all input messages in a sequence have been received before outputting the corresponding output messages. In other applications, messages may only need to be grouped together, independent of the sequence order within the group. For example, the logical to physical (L2P) example described in FIG. 6B provides an example of grouping without explicit sequence control.

To that end, in some embodiments, a message inspection engine performs sequence-related message acceleration (e.g., making sure the sequence numbers are in order and/or that all of the message or information in sequence are present). To do this, the message inspection engine (for example) examines the source and destination to determine if the message in is related to a sequence-restricted operation, and if so, examines the start of sequence and end of sequence flags and the sequence number to ensure that messages are forwarded in proper sequence order at the message out interface. The following figure shows an example of functional modules in a storage controller SOC that are associated with grouping and/or sequence related message acceleration.

Figure 6B:
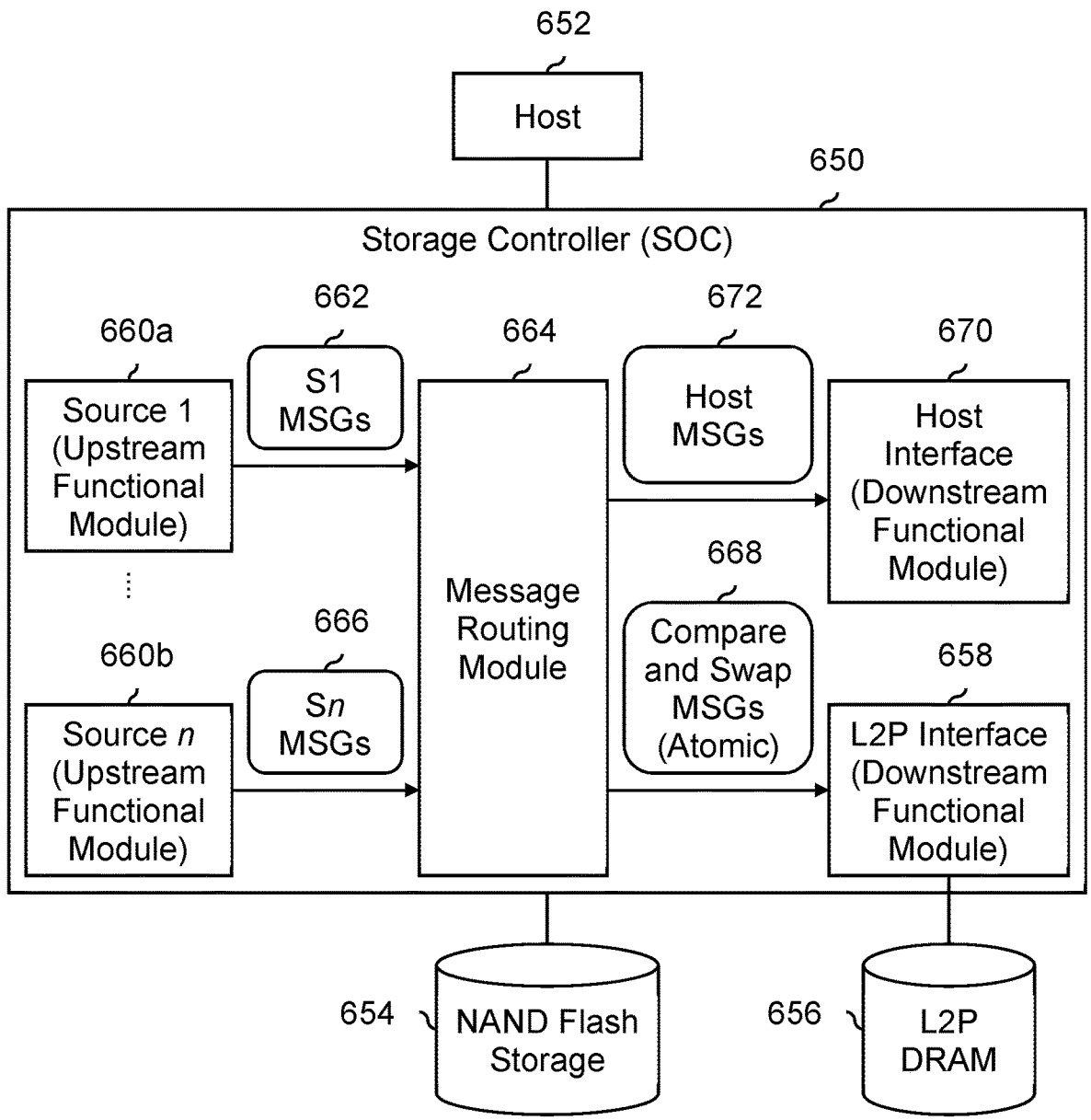
FIG. 6B is a block diagram illustrating an embodiment of a storage controller in which a message routing module performs grouping and/or sequence related message acceleration.

FIG. 6B is a block diagram illustrating an embodiment of a storage controller in which a message routing module performs grouping and/or sequence related message acceleration. In this example, a storage controller (650) is implemented as an SOC and sits between a host (652) and NAND Flash storage (654). The storage controller (650) reads and writes to the NAND Flash storage (654) as directed by the host (652). The host (652) uses and refers to logical addresses whereas data is stored on the NAND Flash storage (654) in physical addresses. The logical-to-physical (L2P) mapping between logical and physical addresses is stored in L2P DRAM (656) which is accessed and managed by the L2P interface (658).

In this example, one of the operations (e.g., "packaged" in one or more messages) that may be directed at the L2P interface (658) is a compare and swap operation. A compare and swap requires a not-insignificant amount of data to be sent to the L2P interface (658) and due to practical message size limits, multiple messages are required to perform a compare and swap.

A compare and swap must be performed atomically, meaning that the L2P interface (658) should not be sent commands and/or messages from other sources while the L2P interface (658) is receiving a series of messages from a given source for a given compare and swap.

For example, suppose that a first source (660a) generates Si MSGs (662) that are associated with a compare and swap operation. Meanwhile, there are other sources (e.g., the $n^{th}$ source (660b)) which are also generating messages (e.g., Sn MSGs (666) directed to the L2P interface (658)) but which are not related to the compare and swap operation for the first source (660a).

In this example, the message routing module (664) receives the Si MSGs (662) from the first source (660a) as well as the Sn MSGs (666) from the $n^{th}$ source (660b). In this example, the message routing module (664) will cause an appropriate module to hold and/or temporarily store the Sn MSGs (666) while compare and swap messages (668) are being sent to the L2P interface (658) so that compare and swap messages (668) are atomic and not interrupted by the Sn MSGs (666).

In some embodiments, to improve performance and/or utilization, the message routing module (664) waits to receive all input messages (662) relating to the compare and swap from the first source (660a) before outputting the corresponding compare and swap messages (668). For example, this may be desirable in applications where such input messages (662) arrive sporadically and/or with non-negligible delays between messages.

If the message routing module (664) did not perform this (e.g., atomic) grouping message acceleration, then there would need to be some locking protocol on the L2P interface (658) to ensure the compare and swap messages are not interrupted by other requests and/or other sources. For example, the n upstream modules (e.g., 660a-660b) would need to implement a cooperative arbitration or locking mechanism to prevent sending messages while a compare and swap message sequence is in progress. Such locking functionality may be complex and reduce the utilization of the L2P interface (658) and/or negatively impact the size, complexity, or performance of the upstream modules (660a and 660b), making the (e.g., atomic) grouping message acceleration performed by the message routing module (664) a more attractive option, at least in some applications.

In another example, the host (652), in at least some situations, expects replies or communications directed to the host (652) to be in sequence (e.g., relating to some sequence order associated with the host). Multiple sources (e.g., 660a-660b) may be generating messages that are (e.g., ultimately) intended for the host (652), however messages (e.g., 662 and 666) may not necessarily arrive in sequential order. In this example, to ensure that a proper sequencing is followed, the message routing module (664) is configured to examine the sequence numbers in the respective incoming messages (e.g., 662 and 666) and ensure that the respective sequencing is followed (e.g., by holding, at an appropriate module, a message or data with a gap in the sequence until the missing message or data arrives) before corresponding host reply messages (672) are generated and output to the host interface (670) in the proper sequential order (e.g., for a given host command). It is noted that this sequence tracking and/or monitoring may be performed independently on the streams of input messages (662 and 666) since each has its own, independent sequence that must be adhered to.

As shown in this example, in some embodiments, an SOC includes a storage controller SOC; a downstream functional module includes a logical to physical (L2P) interface that communicates with L2P storage that is controlled by the storage controller SOC; and analyzing the input message includes determining whether the input message satisfies an out-of-group match criteria during an atomic operation to the L2P storage, wherein in the event it is determined that the input message satisfies the out-of-group match criteria, the configured message inspection engine causes one or more messages associated with the out-of-group match criteria to be held, at least temporarily. For example, if the first source (660a) is sending out Si MSGs (662) associated with an atomic compare and swap operation while the $n^{th}$ source (660b) is concurrently and/or simultaneously outputting Sn MSGs (666) which are also directed to the L2P interface (658), the message routing module (664) will temporarily retain and/or not pass on messages to the L2P interface (658) from the $n^{th}$ source (660b) while the compare and swap from the first source (660a) is being performed.

As shown in this example, in some embodiments, an SOC includes a storage controller SOC; a downstream functional module includes a host interface that communicates with a host that is external to the storage controller SOC; and analyzing the input message includes determining whether the input message satisfies an out-of-sequence match criteria, wherein in the event it is determined that the input message satisfies the out-of-sequence match criteria, the configured message inspection engine causes one or more messages associated with the out-of-sequence match criteria to be held, at least temporarily. For example, the message routing module (664) will ensure that host MSGs (672) corresponding to Si MSGs (662) from the first source (660a) will be in the proper (e.g., host mandated) sequencing, even if the Si MSGs (662) are received out of order at the message routing module (664). Similarly, the message routing module (664) will (e.g., independently) enforce and/or ensure the proper sequence is followed in host MSGs (672) corresponding to Sn MSGs (666) from the $n^{th}$ source (660b).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message; and
the downstream functional module, wherein:
the SOC further includes a second upstream functional module and a second message inspection engine that is configured using the configuration information to obtain a second configured message inspection engine;

the configured message inspection engine performs error handling, including by examining input messages from the upstream functional module for one or more specified types of error messages; and the second configured message inspection engine performs message acceleration, including by examining input messages from the second upstream functional module for one or more specified types of non-error messages.

2. The SOC of claim 1, wherein at least the content modification plan is associated with error handling.

3. The SOC of claim 1, wherein at least the content modification plan is associated with message acceleration.

4. The SOC of claim 1, wherein at least the content modification plan is associated with message acceleration, including one or more of the following: grouping related message acceleration or sequence related message acceleration.

5. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message;
the downstream functional module;
a second upstream functional module; and
a second message inspection engine that is configured using the configuration information to obtain a second configured message inspection engine, wherein:
the configured message inspection engine analyzes those input messages from the upstream functional module and ignores those input messages from the second upstream functional module; and
the second configured message inspection engine ignores said those input messages from the upstream functional module and analyzes said those input messages from the second upstream functional module.

6. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message; and
the downstream functional module, wherein:
the input message includes a header which in turn includes a plurality of fields;
analyzing the input message includes inspecting those fields in the plurality of fields that are specified by the configuration information;
the input message further includes a payload which in turn includes a plurality of inspectable segments and a non-inspectable portion that does not overlap with the plurality of inspectable segments; and
analyzing the input message further includes inspecting those inspectable segments in the plurality of inspectable segments that are specified by the configuration information.

7. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message; and
the downstream functional module, wherein:
the SOC includes a storage controller SOC;
the upstream functional module includes an error correction decoder;
the downstream functional module includes a storage media interface that communicates with storage media that is external to the storage controller SOC; and
analyzing the input message includes:
determining whether the input message satisfies an error message match criteria; and
in the event it is determined that the input message satisfies the error message match criteria, the content modification plan includes generating an output message associated with re-reading the storage media and the destination control plan includes directing the output message associated with re-reading the storage media to the storage media interface.

8. The SOC of claim 7, wherein the content modification plan further includes generating the output message associated with re-reading the storage media to change a read configuration associated with re-reading the storage media.

9. The SOC of claim 1, wherein the content modification plan includes generating an output message associated with reconfiguration.

10. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message; and
the downstream functional module, wherein:
the SOC includes a storage controller SOC;
the downstream functional module includes a logical to physical (L2P) interface that communicates with L2P storage that is in the storage controller SOC; and
analyzing the input message includes determining whether the input message satisfies an out-of-group match criteria during an atomic operation to the L2P storage, wherein in the event it is determined that the input message satisfies the out-of-group match criteria, the configured message inspection engine causes one or more messages associated with the out-of-group match criteria to be held, at least temporarily.

11. A System On Chip (SOC), comprising:
an upstream functional module;
a message inspection engine, wherein:
the message inspection engine is implemented in hardware in the SOC and is configured using configuration information to obtain a configured message inspection engine; and
the configured message inspection engine:
receives an input message from the upstream functional module;
analyzes the input message to determine a content modification plan and a destination control plan;
generates an output message based at least in part on the input message, the content modification plan, and the destination control plan, including by populating the output message with a downstream functional module specified by the destination control plan; and
outputs the output message; and
the downstream functional module, wherein:
the SOC includes a storage controller SOC;
the downstream functional module includes a host interface that communicates with a host that is external to the storage controller SOC; and
analyzing the input message includes determining whether the input message satisfies an out-of-sequence match criteria, wherein in the event it is determined that the input message satisfies the out-of-sequence match criteria, the configured message inspection engine causes one or more messages associated with the out-of-sequence match criteria to be held, at least temporarily.

12. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and
outputting the output message from the configured message inspection engine, wherein:
the SOC further includes a second upstream functional module and a second message inspection engine that is configured using the configuration information to obtain a second configured message inspection engine; and
the method further includes:
performing error handling using the configured message inspection engine, including by examining input messages from the upstream functional module for one or more specified types of error messages; and
performing message acceleration using the second configured message inspection engine, including by examining input messages from the second upstream functional module for one or more specified types of non-error messages.

13. The method of claim 12, wherein at least the content modification plan is associated with error handling.

14. The method of claim 12, wherein at least the content modification plan is associated with message acceleration.

15. The method of claim 12, wherein at least the content modification plan is associated with message acceleration, including one or more of the following: grouping related message acceleration or sequence related message acceleration.

16. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and
outputting the output message from the configured message inspection engine, wherein:
the SOC further includes a second upstream functional module and a second message inspection engine that is configured using the configuration information to obtain a second configured message inspection engine; and the method further includes:
analyzing, at the configured message inspection engine, those input messages from the upstream functional module and ignore those input messages from the second upstream functional module; and
ignoring, at the second configured message inspection engine, said those input messages from the upstream functional module and analyze said those input messages from the second upstream functional module.

17. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and
outputting the output message from the configured message inspection engine, wherein:
the input message includes a header which in turn includes a plurality of fields;
analyzing the input message includes inspecting those fields in the plurality of fields that are specified by the configuration information;
the input message further includes a payload which in turn includes a plurality of inspectable segments and a non-inspectable portion that does not overlap with the plurality of inspectable segments; and
analyzing the input message further includes inspecting those inspectable segments in the plurality of inspectable segments that are specified by the configuration information.

18. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and
outputting the output message from the configured message inspection engine, wherein:
the SOC includes a storage controller SOC;
the upstream functional module includes an error correction decoder;
the downstream functional module includes a storage media interface that communicates with storage media that is external to the storage controller SOC; and
analyzing the input message includes:
determining whether the input message satisfies an error message match criteria; and
in the event it is determined that the input message satisfies the error message match criteria, the content modification plan includes generating an output message associated with re-reading the storage media and the destination control plan includes directing the output message associated with re-reading the storage media to the storage media interface.

19. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and
outputting the output message from the configured message inspection engine, wherein:
the SOC includes a storage controller SOC;
the downstream functional module includes a logical to physical (L2P) interface that communicates with L2P storage that is in the storage controller SOC; and
analyzing the input message includes determining whether the input message satisfies an out-of-group match criteria during an atomic operation to the L2P storage, wherein in the event it is determined that the input message satisfies the out-of-group match criteria, the configured message inspection engine causes one or more messages associated with the out-of-group match criteria to be held, at least temporarily.

20. A method, comprising:
receiving configuration information;
configuring a message inspection engine, implemented in hardware in a System on Chip (SOC), using the configuration information to obtain a configured message inspection engine;
receiving, at the configured message inspection engine, an input message from an upstream functional module in the SOC;
analyzing, using the configured message inspection engine, the input message to determine a content modification plan and a destination control plan;
generating, using the configured message inspection engine, an output message based at least in part on the input message, the content modification plan, and the destination control plan, including by populating the output message with a downstream functional module specified by the destination control plan; and outputting the output message from the configured message inspection engine, wherein:

the SOC includes a storage controller SOC;

the downstream functional module includes a host interface that communicates with a host that is external to the storage controller SOC; and analyzing the input message includes determining whether the input message satisfies an out-of-sequence match criteria, wherein in the event it is determined that the input message satisfies the out-of-sequence match criteria, the configured message inspection engine causes one or more messages associated with the out-of-sequence match criteria to be held, at least temporarily.

\* \* \* \* \*